No. 718,449. PATENTED JAN. 13, 1903.
L. L. FROST.
TALLY DEVICE.
APPLICATION FILED APR. 9, 1902.
NO MODEL. 3 SHEETS—SHEET 1.
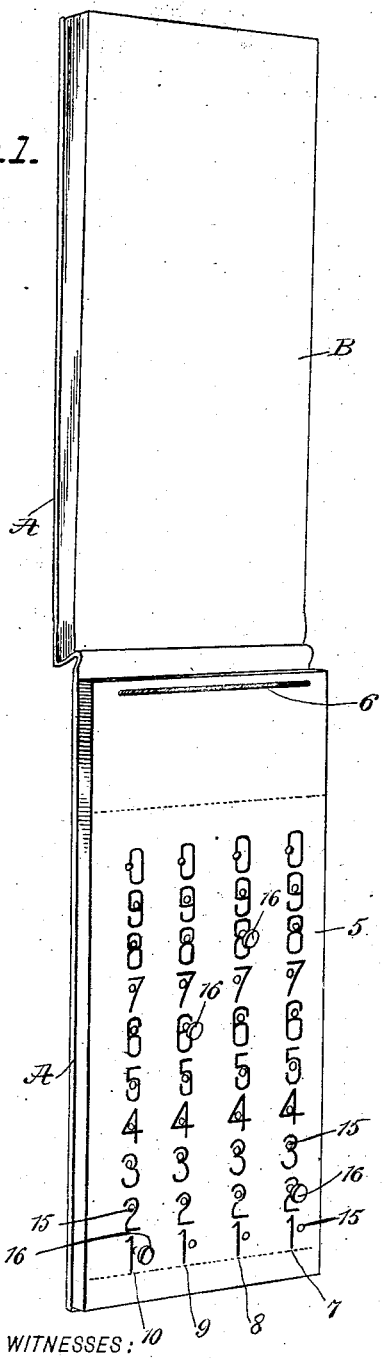
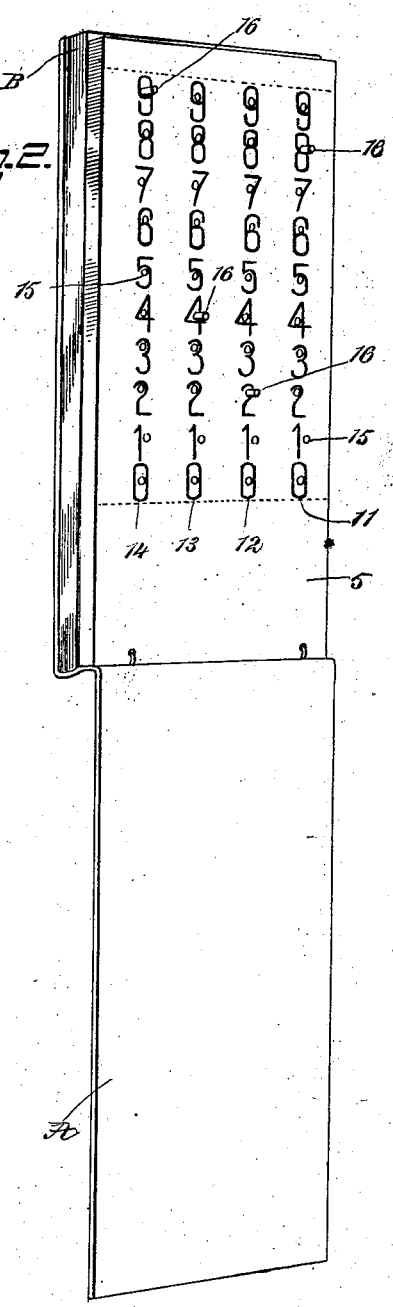
WITNESSES:
INVENTOR
Leonard L. Frost
BY
ATTORNEYS No. 718,449. PATENTED JAN. 13, 1903.
L. L. FROST.
TALLY DEVICE.
APPLICATION FILED APR. 9, 1902.
NO MODEL. 3 SHEETS—SHEET 2.
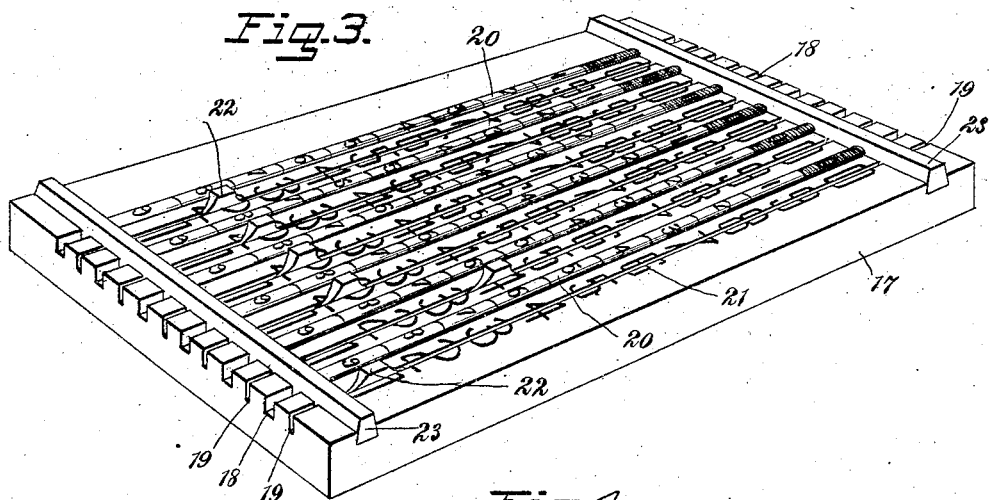
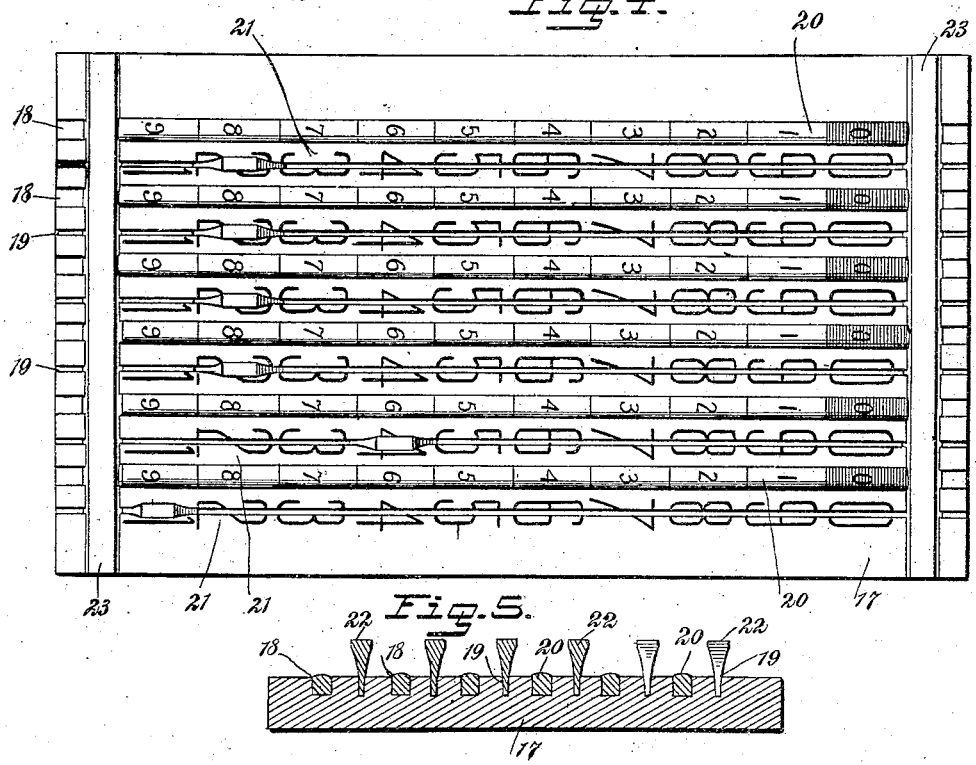
WITNESSES:
James F. Duhamel
N. F. Benchaff
INVENTOR
Leonard L. Frost
BY
ATTORNEYS No. 718,449. PATENTED JAN. 13, 1903.
L. L. FROST.
TALLY DEVICE.
APPLICATION FILED APR. 9, 1902.
NO MODEL. 3 SHEETS—SHEET 3.
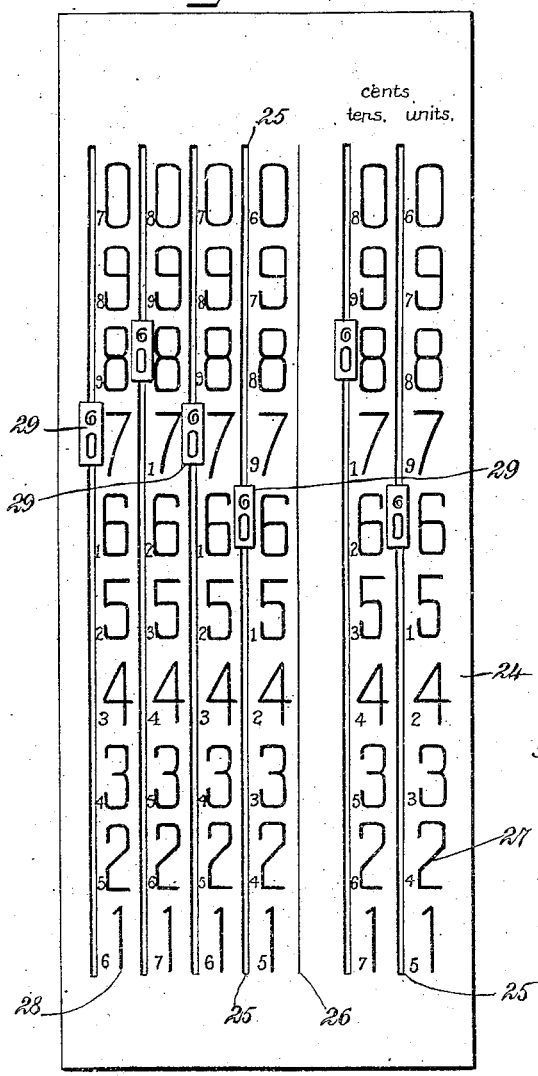
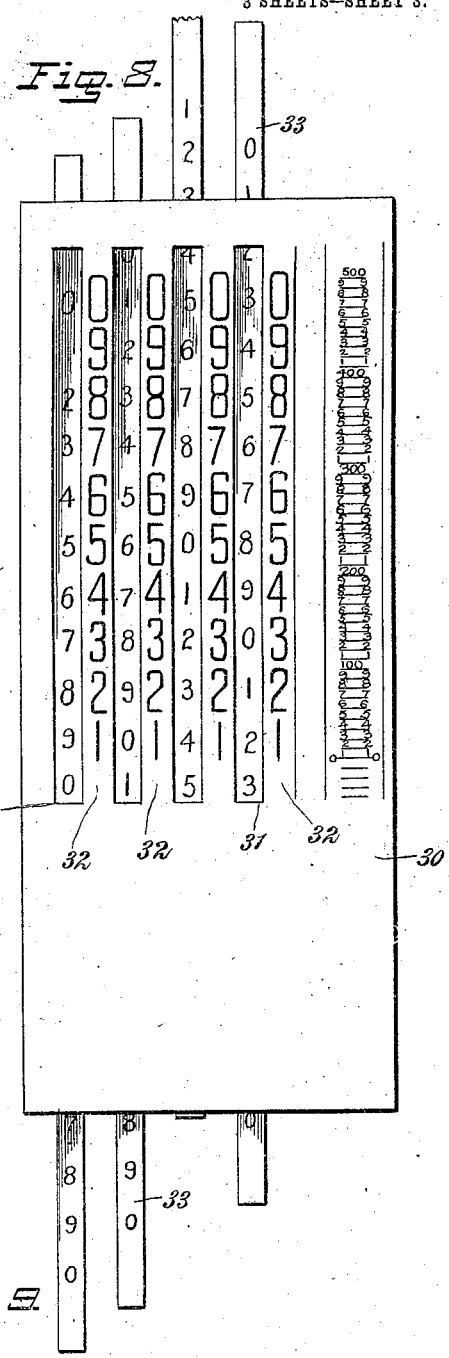
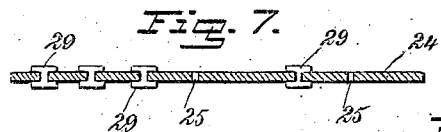
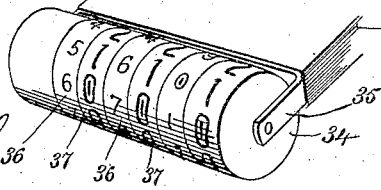
WITNESSES: INVENTOR
James F. Duhamel Leonard L. Frost
BY
ATTORNEYS
THE NORRIS PETERS CO., WASHINGTON, D. C.

UNITED STATES PATENT OFFICE.

LEONARD L. FROST, OF HIGHLAND, KANSAS.

TALLY DEVICE.

SPECIFICATION forming part of Letters Patent No. 718,449, dated January 13, 1903.

Application filed April 9, 1902. Serial No. 102,089. (No model.)

*To all whom it may concern:*

Be it known that I, LEONARD L. FROST, a citizen of the United States, residing at Highland, in the county of Doniphan and State of Kansas, have invented certain new and useful Improvements in Tally Devices, of which the following is a full, clear, and exact description.

My invention relates to improvements in tally devices adapted for use in connection with check-books or with account-books, although it may be employed generally in the addition or subtraction of figures.

The object that I have in view is the provision of a simple and efficient device by which the value of a given amount may be increased or diminished in an easy and simple manner by the addition or subtraction of different amounts, such as constantly arise in business or commercial transactions. An increase in the valve of the given amount can be quickly ascertained by addition of a certain amount—as, for example, when a certain amount is deposited to the credit of a person doing business with a banking concern; but when a check is drawn against the bank account the tally device will indicate the amount charged against the account and the balance remaining to the credit of the depositor, thus denoting a decrease in the value of the original deposit.

In carrying my invention into practice I provide a tally device having columns or rows of dominant figures, each column having the figures disposed progressively, other columns or rows of supplementary figures disposed in inverse order to the dominant columns, and indicators of any character to denote an increase or decrease in the original figures of said columns of the dominant and supplementary figures.

The invention further consists in the construction, arrangement, and adaptation of parts, which will be hereinafter more fully described, and pointed out in the claims.

Reference is to be had to the accompanying drawings, forming a part of this specification, in which similar characters of reference indicate corresponding parts in all the figures.

Figure 1 is a perspective view of my tally device embodied as a part of a check or draft book and showing the tally device adjusted to one position in order to represent the columns of dominant figures. Fig. 2 is a similar view showing the tally device adjusted to a reversed position in order to represent the complementary columns of supplementary figures. Fig. 3 is a perspective view of another embodiment of the invention in which the two series of columns of dominant and supplementary figures are exposed to view at a glance, and shiftable indicators are combined with said columns to indicate the prime factors therein. Fig. 4 is a plan view of the device shown by Fig. 3. Fig. 5 is a transverse section through the device shown by Figs. 3 and 4. Fig. 6 is a plan view of another embodiment of the tally device. Fig. 7 is a cross-section of the device shown by Fig. 6. Figs. 8 and 9 are respectively a plan view and a perspective view of two other embodiments of the invention in which the columns of figures of one character are shiftable relatively to the columns of figures of the other character.

I will now proceed to describe a simple form of the invention, (represented by Figs. 1 and 2,) in which the letter A indicates the covers of a book adapted to receive checks, drafts, &c., said checks or the like being indicated at B. The tally device consists of a tablet 5, which may be bound in as a part of the book, and this tally device is shown by the drawings as being attached to one of the covers A by a suitable binding device 6. The tablet 5 corresponds in form and size to the dimensions of the book, and it is adapted to be housed or contained therein when the book is closed. This tablet may be made of celluloid or any composition adapted to receive effaceable marks, such as pencil-marks, which may be temporarily employed in connection with the columns of dominant and supplementary figures, as will hereinafter more fully appear, although it will be understood that I do not desire to restrict myself to the manufacture of the tablet from any particular material.

One face of the tablet, as shown by Fig. 1, is provided with columns of dominant figures, said columns of figures being three or more in number and arranged in parallel order. The columns of figures are indicated by the numerals 7, 8, 9, and 10, each column having numbers arranged progressively and extending from the bottom to the top, said numbers comprising the cardinals "1," "2," "3," "4," "5," "6," "7," "8," "9," and the character "0." These columns are devoted to units, tens, hundreds, and thousands, according to the established decimal system. The device shown by Figs. 1 and 2 does not contemplate the employment of columns adapted to receive cents in units and tens; but it is evident that the number of columns may be increased to provide not only for calculations in cents, but up to tens of thousands, hundreds of thousands, and any desired limit.

The columns of dominant figures 7, 8, 9, and 10 are numbered beginning with the cardinal "1" at the bottom of the page and ending with the character "0" at the heads of the columns, as shown by Fig. 1; but on the opposite or reverse side of the tablet are provided other columns of supplementary figures, the same being indicated at 11, 12, 13, and 14. These columns of supplementary figures correspond in number to the columns of dominant figures, and the figures in one group of columns are disposed opposite and in corresponding positions to the figures in the other group of columns. There is one important and distinguishing difference, however, between the order of arrangement of the figures in the group of dominant columns and the figures in the group of supplementary columns, and this distinction consists in arranging the columns of the supplemental group so that the figures will run in reverse order to the figures of the columns in the dominant group. The figures in the supplementary columns begin with the highest cardinals "9" at the heads of the columns, while the characters "0" are at the foot of the columns, as shown by Fig. 2. Taking the columns 7 and 11 as examples, the character "0" at the head of the column 7 is directly opposite to the character "9" at the head of the column 11. The second cardinals in the two columns 9 and 8 are opposite to each other. The third cardinals "5" and "7" in the two columns 7 and 11 are opposite to each other, and so on throughout the length of the columns.

The tablet 5 is provided with transverse perforations 15, which pass through oppositely-placed figures in the columns, and in these apertures may be thrust the indicator pins or studs 16.

The tally device shown by Figs. 1 and 2 may be used to indicate the balance standing to the depositor or creditor in the bank, and the example represented is adapted to count up to ten thousand, the count commencing at the right, indicating units, tens, hundreds, and thousands, running toward the left.

I will give a practical example of keeping trace of the bank account as it fluctuates by drawing checks against the same or by increasing the deposit. Suppose an individual opens an account with a bank or firm and deposits an even ten thousand dollars to his credit. The first day a draft is made for sixteen hundred and eighty-two dollars, a second draft for one hundred and fifty-two dollars, another for thirty-nine dollars, and another for fifty-seven dollars. For the first draft the depositor places the studs at the head of each separate column in the character "0," indicating units, tens, hundreds, and thousands, because they are called for in this example. A deposit-mark "Z" is placed beside each "0" at the head of each column, because such deposit-marks indicate that the full ten thousand dollars is deposited to the credit of the individual. Starting with units always, the first draft of sixteen hundred and eighty-two dollars calls for "2" in the units-column. The stud 16 is removed from "0" in the units-column 7 and is placed in "2," as indicated in Fig. 1. Now pass to the tens-column and place the stud 16 in the figure "8," because eight is called for by the draft. Pass next to the hundreds-column and place the stud 16 in "6," because six is called for, and finally pass to the thousands-column and place the stud in "1," because that number is called for. Now the page reads that by the sign "Z" at the head of each column the individual has deposited ten thousand dollars, and the figures in the columns in which the studs are fitted read that the depositor has checked out sixteen hundred and eighty-two dollars. The tablet 5 is turned over, so as to expose the face represented by Fig. 2, and it will be seen that the stud 16 protrudes through certain figures in the supplementary columns 11, 12, 13, and 14. Taking those figures next beneath those through which the studs protrude, (except always in the units-column 11 or in case the units-column has not been operated then it is the next or tens column,) the figure in this last column must be read through which the stud protrudes, because there is no displacement by cutting out by the next right-hand column, there being no right hand to the units. The protrusion of the studs through the supplemental columns in the example heretofore given indicates the balance remaining to the credit of the depositor after subtracting the first draft, and in this instance the balance reads that eight thousand three hundred and eighteen dollars remains to the depositor's credit.

Passing now to the next draft of one hundred and fifty-two dollars, the tablet 5 should be turned back to the position shown by Fig. 1, and as one hundred and fifty-two dollars is the amount called for it is evident that the number "2" is the unit which should be first attended to. As the stud rests in figure "2" of the units-column after the transaction heretofore described has been completed and as the unit "2" is called for, the stud 16 should be placed in the figure "4" in the units-column. Now passing to the tens-column five is called for and the stud is resting in figure "8" in the tens-column. As eight and five are thirteen, the stud should be placed in figure "3" in the tens-column and one should be carried to the hundreds-column. As one is the final number called for by the transaction and as the stud rests in figure "6" in the hundreds-column, but as the depositor has passed the deposit-mark "Z" in the tens-column and must carry one to the hundreds-column, you must call it two. Two plus six are eight, and the stud must be placed in the figure "8" in the hundreds-column, no thousands being called for. The tablet indicates that the depositor has paid out eighteen hundred and thirty-four dollars, and by turning the tablet over to the position in Fig. 2 the studs will indicate that the balance remaining in the bank is eight thousand one hundred and sixty-six dollars. The tablet should now be turned back to the position indicated by Fig. 1 and the stud 16 should be manipulated to subtract the next draft of thirty-nine dollars from the balance in the bank. It will be seen that the unit "9" is called for by this draft. As the units-stud occupies the number "4" in the units-column and as nine and four are thirteen, the stud 16 should be placed in the number "3" in the units-column. Passing to the tens-column, three is called for in tens. The stud 16 is resting in figure "3" in the tens-column. The three called for by the new transaction of the draft thirty-nine dollars should be added to the three already contained in the tens-column; but as the depositor has passed the deposit-mark in the units-column the one left over from the transaction should be added to the total of three plus three, thus making seven, which requires the operator to place the stud in the figure "7" in the tens-column. The indication now given by the exposed face of the tablet in Fig. 1 shows that eighteen hundred and seventy-three dollars have been paid out, and by turning the tablet over, so as to observe the obverse face thereof, as indicated by Fig. 2, the pins or studs will indicate that there is a balance of eight thousand one hundred and twenty-seven dollars remaining to the credit of the depositor after completing these operations. The manner of deducting the last amount of fifty-seven dollars will be obvious from the preceding description.

In case the bank account is started with an odd amount, which does not begin or end in even thousands or hundreds, provision is made for keeping tally of the account in the following way: Suppose the depositor places six thousand five hundred and thirty-four dollars to his credit. The tablet is turned to expose the dominant columns, as in Fig. 1, and the deposit-mark "Z" is placed beside the number "6" in the thousands-column, the number "5" in the hundreds-column, the number "8" in the tens-column, and the number "4" in the units-column, these figures being called for by the deposit. The reading of this page of the tablet shows that the individual has deposited six thousand five hundred and thirty-four dollars, because the deposit-marks "Z" indicate the amount in each separate column. Next commencing at the thousands-column pick out the deposit-figure in that column, which it will be obvious is "6." Opposite to that figure and on the left-hand side thereof mark down the character "0." Now pass on down the column, marking opposite to the left at each large figure its complementary small numeral until the place of beginning is reached, thus: "$_0 6 \, _1 7 \, _2 8 \, _3 9 \, _4 0 \, _5 1 \, _6 2 \, _7 3 \, _8 4 \, _9 5$." Now pass to the hundreds-column and pick out the deposit-figure by the deposit-mark "Z" and place beside it on the left the character "0," the same as in the previous example in the thousands-column, and then proceed to fill out the column in hundreds the same as in the thousands-column with the small numerals, this operation being continued until all the columns in which the deposit-figures are called for are exhausted. If no hundreds are called for, that is indicated by placing the deposit-mark "Z" beside the large naught at the head of the hundreds-column, and in this event the small numbering in the hundreds-column must begin by placing the small naught beside the large naught and thereafter placing the small numerals beside the large figures in the column. The deposit having been made and the amount indicated on the tablet, the depositor is in the position to make a draft on his account, say, of one thousand three hundred and thirty-three dollars. Commencing at the units-column 7, place the stud in the figure "3" in said units-column, because three is called for. Now passing to the next or tens column on the left, place the stud in the figure "3," because three is called for. This operation is repeated in the hundreds-column, and finally passing to the thousands-column the stud is placed in number "1" of that column, because one is called for in thousands. The tablet now indicates that the depositor has placed six thousand five hundred and thirty-four dollars to his credit and drawn out one thousand three hundred and thirty-three dollars, leaving a balance of five thousand two hundred and one dollars. In reading the indication the large figures (designated by the deposit-mark "Z") indicate the amount of the deposit. The large figures having the studs fixed therein indicate the amount of the draft against the deposit or the amounts of the successive drafts, and the small figures directly to the left of the large figures, through which the studs are fixed at each last operation or draft, indicate the amount remaining after each draft.

In Figs. 3, 4, and 5 of the drawings I have represented another embodiment of the tally device, which embraces the generic features described in connection with the construction of Figs. 1 and 2. In this form of the invention a base-board 17 is provided with a plurality of wide grooves or channels 18 and with a plurality of narrow grooves or channels 19, the channels of different widths alternating one with the other, as more clearly indicated by Fig. 3. The wide channels 18 are adapted to receive shiftable blocks 20, each series of blocks being ten in number and fitted snugly in the channels 18, so as to abut one against the other. I have shown the tally device as equipped with six series of blocks, which occupy the wide channels, each series consisting of ten blocks, and these blocks are numbered with the cardinals "1" to "9," inclusive, and with the character "0." The blocks indicating the "0" are at the heads of the supplementary columns, and the columns have the cardinals "1" to "9," inclusive, disposed in progressive order below the blocks with the character "0," so that the cardinal "9" in the columns will be at the foot thereof.

The wide spaces between the blocks having the numbers of the supplementary columns are inscribed with figures denoting the dominant columns, such figures of the dominant columns being very large and prominent as compared with the figures in the supplementary columns. By inspection of Fig. 4 it will be seen that the figures in the dominant columns run in the reverse order with respect to value to the figures in the supplementary columns, the columns of two characters being placed side by side, so as to insure ready comparison of the different columns of figures. The figures of the dominant columns 21 are intersected by the narrow grooves or channels 19, and these narrow grooves or channels accommodate the shiftable indicators 22, the latter being tapered, as shown more clearly by Fig. 3, in order to wedge themselves in place after having been shifted to the proper positions. These indicators extend for a considerable distance above the active exposed face of the base-board in order that the operator may easily grasp the indicator and slide the same along in the groove 19 to the different positions opposite the figures in the columns, whereby the indicators will be adjusted without disturbing the positions of the blocks 20, having the figures of the supplementary columns. The blocks 20 are kept in place and the slidable movement of the indicators 22 is limited by the employment of the transverse rails or bars 23, which are let into corresponding dovetailed grooves near the end portions of the base-board 17.

The blocks 20, bearing the figures of the supplementary columns, are transferable to any position in the respective columns, and the large figures in the dominant columns are preferably permanent in character; but, if desired, this permanent and shiftable character of the figures in the two columns may be reversed, so that the large figures can be transferred, while the small figures remain fixed in place. If desired, the blocks 20, which carry the characters indicating "0," may be of contrasting color to the remaining blocks carrying the cardinal figures of the supplementary column.

The method of operating the tally device is substantially the same as in the example heretofore given, except that the indicators 22 are slid along the narrow channels to their proper places instead of being shifted from one aperture to the other. It should be borne in mind, however, that in any operation whenever the sliding indicator passes a deposit number or mark, whether it be at "1,000,000" or at any intermediate number between "1" and "1,000,000" in any column and at any place in the column, one must be carried to the next column on the left.

In the construction shown in Figs. 6 and 7 I employ a base 24, which is provided with the longitudinal slots or guideways 25, and the face of this base is provided with a dividing-column 26 to separate prominently the face of the base into two sections, one section adapted to receive columns which indicate the value in cents and the other section to receive columns indicating values in dollars. The smaller section has two columns 27 of dominant figures, which columns are separated by the intermediate slots 25 and have the cardinals thereof running progressively from the bottom toward the top, each column terminating in the character "0" at the head thereof. The larger section of the base is inscribed with four or more columns of dominant figures running progressively from the bottom toward the top, as indicated at 28, said columns being separated by the intervening slots 25. The columns of dominant figures have the characters quite large, so as to be plainly visible, and the columns of supplementary figures running in reverse order are in small characters, the same being disposed adjacent to the characters of the dominant figures. In the slots 25 are slidably fitted the indicators 29, which preferably take the cross-sectional shape indicated more clearly by Fig. 7, and these indicators are adapted to be adjusted lengthwise in the slots 25, so as to take the required positions opposite to the large and small characters representing the dominant and supplementary columns of figures. If desired, these indicator-slides 29 may be inscribed with the deposit-mark, as shown by Fig. 6.

The invention in its generic aspect may be embodied in various other forms, which include the two groups of dominant and supplementary figures running in reverse order, and in Figs. 8 and 9 I have shown various devices which contemplate the arrangement of the columns of one group in shiftable relation to the columns of the other group, thus dispensing with the employment of the indicators or slides, although it will be understood that in the preferred embodiment of the invention I employ a suitable base having the characters thereon and shiftable means to indicate the changing value of the figures in the respective columns. In Fig. 8 the base 30 is slotted, as indicated at 31, and between the slots are the spaces 32, adapted to receive the large characters representing the columns of dominant figures. The slides or strips 33 are fitted to the base 30, so as to be guided lengthwise of the slots 31 therein, and these slides or strips are provided with the columns of supplemental figures, the same running in reverse order to the columns of the dominant figures.

The base may be embodied in the form of a circular cylinder, as shown by Fig. 9, said cylinder being indicated at 34 and adapted to be journaled in a bracket 35, which is mounted on the bound edge of a check-book or any other device. This circular base or cylinder is provided with shiftable strips 36 37, and the strips 36 are provided or inscribed with the columns of dominant figures, while the intermediate or alternate strips 37 have the columns of supplementary figures, the latter running in reverse order to the columns of the dominant figures.

Although I have shown and described my tally device as adapted for use in calculating the balance remaining to the credit of a bank depositor, it will be understood that the improved device may be used for any other purpose. Furthermore, as shown and described, the device is provided with numbers arranged according to the decimal system; but these numbers and the calculations based thereon may be expressed according to the English monetary standard in pounds, shillings, and pence.

Having thus described my invention, I claim as new and desire to secure by Letters Patent—

1. A tally device substantially such as described, provided with fixed columns of dominant figures and complementary columns of supplementary figures adjacent thereto, each column of figures including the cardinals from "1" to "9" inclusive, and the zero character "0," and the columns of supplementary figures arranged in reverse order as respects value to the dominant figures, and means to indicate the changing value of figures in the two sets of columns, including a character to be set opposite the characters in the dominant columns.

2. A tally device substantially such as described, provided with fixed columns of dominant figures, and complementary columns of supplementary figures, each column of figures including the cardinals from "1" to "9" inclusive, and the zero character "0," and the figures in the supplementary columns running in reverse order as respects value to the dominant columns, and shiftable means operatively related to both groups of columns to indicate the changing value of the figures in the two sets of columns.

3. A tally device substantially such as described, provided with fixed columns of dominant figures, and complementary columns of supplementary figures, each column of figures including the cardinals from "1" to "9" inclusive and the zero character "0," and the figures in the supplementary columns running in reverse order as respects value to the dominant columns, and shiftable indicator means related to the columns of figures of the two groups, and an indicator character adapted to be placed opposite the figures in the dominant columns to denote the changing value in the figures of both groups of columns.

In testimony whereof I have signed my name to this specification in the presence of two subscribing witnesses.

LEONARD L. FROST.

Witnesses:
JAS. L. ALLEN,
CHAS. S. LEONARD.